June 15, 1965 J. W. GLESSNER 3,188,967
FLUID PRESSURE BOOSTER
Filed May 26, 1961 6 Sheets-Sheet 1

INVENTOR
John W. Glessner

ATTORNEY

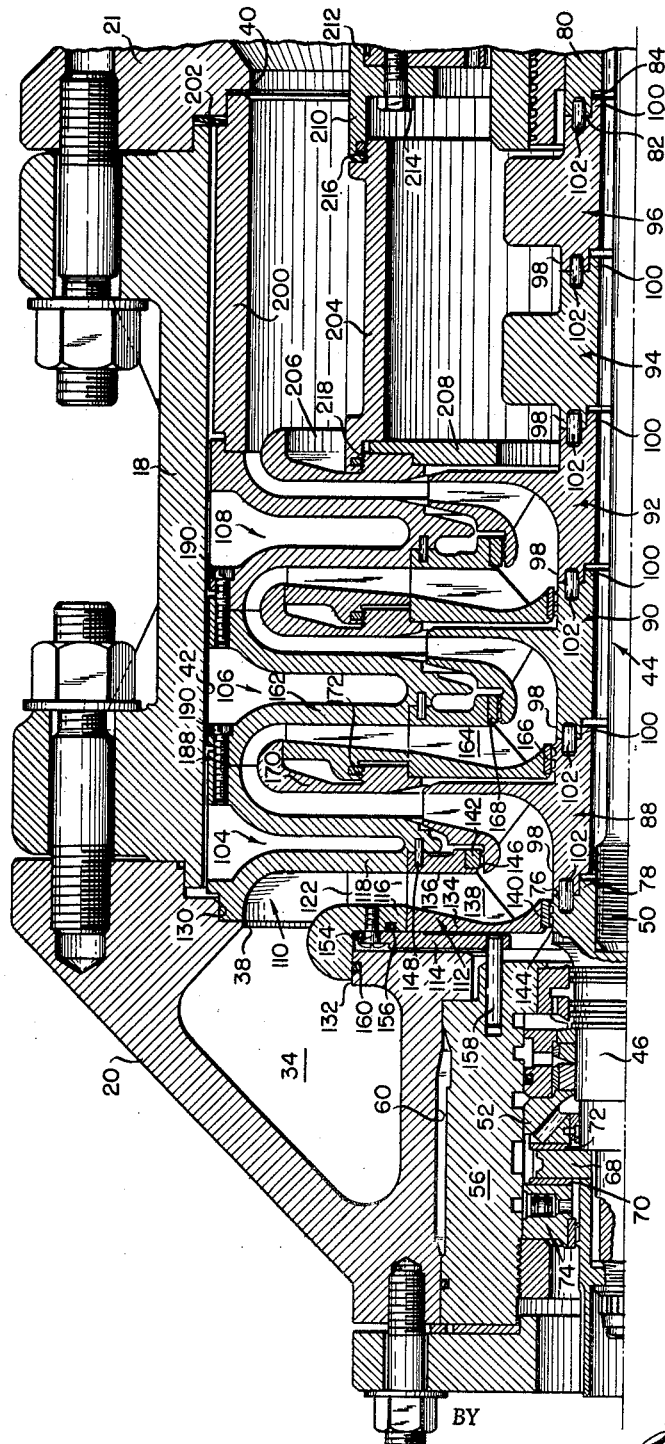

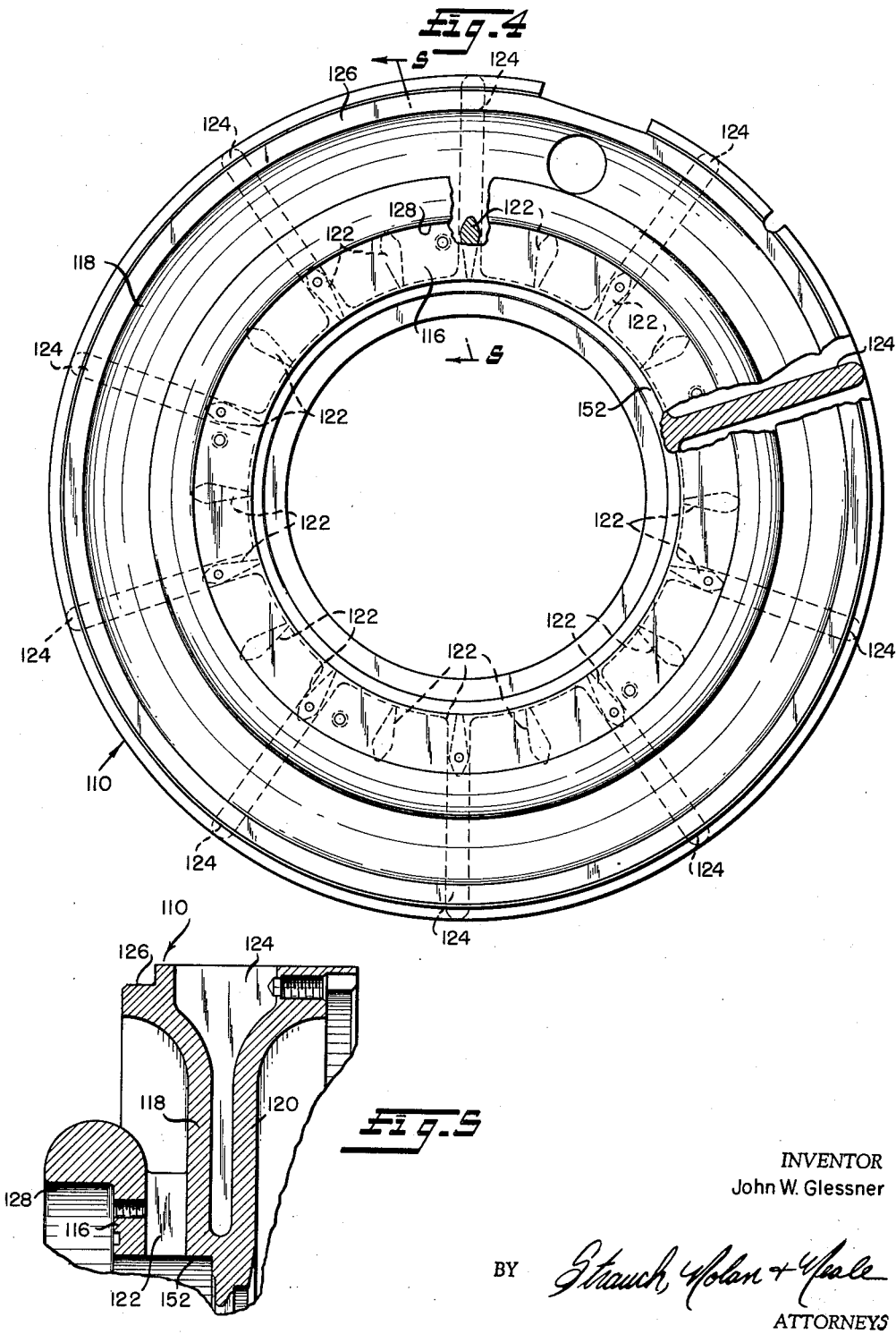

June 15, 1965 J. W. GLESSNER 3,188,967
FLUID PRESSURE BOOSTER

Filed May 26, 1961 6 Sheets-Sheet 5

INVENTOR
John W. Glessner

BY *Strauch, Nolan & Neale*
ATTORNEYS

June 15, 1965  J. W. GLESSNER  3,188,967
FLUID PRESSURE BOOSTER
Filed May 26, 1961  6 Sheets-Sheet 6

INVENTOR
John W. Glessner

BY *Strauch, Nolan & Neale*
ATTORNEYS 3,188,967
FLUID PRESSURE BOOSTER
John W. Glessner, San Diego, Calif., assignor to Solar Aircraft Company, San Diego, Calif., a corporation of California
Filed May 26, 1961, Ser. No. 112,986
2 Claims. (Cl. 103—108)

The present invention relates generally to fluid pressure boosters such as gas compressors and liquid pumps, more particularly to such compressors and pumps used in conjunction with fluid conveying systems, and specifically to a novel arrangement of fluid pressure boosters which provides a basic housing and a kit of stationary and rotary parts which may be quickly and easily operatively assembled in such housing to satisfy a wide range of pressure and flow requirements encountered in pumping gas and liquid.

The invention provides an improved method of and apparatus for providing a substantially constant fluid pipe line delivery pressure from a variable pressure source, comprising a number of interchangeable compressor or pumping stages, and a series of spacer elements such that various combinations of compressor stages may be assembled in the housing, with or without spacers, and utilized to accommodate with optimum efficiency substantially any conditions and requirements commonly encountered in the field.

While the fluid pressure booster of the present invention will be discussed primarily in terms of a gas compressor, it will be clear to those skilled in the art that the basic principles thereof are equally applicable to a liquid pump.

For a clear understanding of the utility of the present invention, the problems overcome by the present invention will be briefly discussed, for example, in terms of a supply piping system between a natural gas field and a consumer of the gas, such as a village or some industrial plant.

Assuming that at a given time the pressure in the supply well is 1000 p.s.i and that it is required that the gas be supplied to the consumer at a pressure of 1500 p.s.i., it is customary to meet these requirements by providing in the line a gas compressor, run by such means as a gas turbine or other prime mover, which will accept the gas from the well at a pressure of 1000 p.s.i. and boost the delivery pressure to 1500 p.s.i., i.e. develop a pressure ratio across the pump of 1.5:1. Now, however, it is also well known that over a period of time the pressure in the well will decrease and a point will be reached where the pressure at the suction end of the compressor is only 750 p.s.i., for example. Thus, since the 1.5:1 ratio will remain constant, the delivery pressure will be only 1125 p.s.i., 375 p.s.i. below that required by the consumer.

The prior art has solved this problem either by replacing the original compressor with a different compressor which has the capability of developing a 2:1 pressure ratio, or by incorporating a plurality of compressors in the line such that by several successive compressions the gas may be boosted to the desired pressure. This procedure is quite expensive and, as a result, a considerable delivery pressure drop must be tolerated before it is economically feasible to provide a new or supplemental compressor. Such a pressure drop is customarily made tolerable by providing a compressor of a higher compression ratio than is initially required and incorporating output pressure regulating valves in the line at the delivery point downstream of the compressor.

The present invention solves this problem by providing a basic pressure booster structure into which a series of elements may be readily and easily selectively installed in the housing to increase the pressure boosting capability of the booster from an initially required pressure ratio to a higher ratio subsequently required, as will be fully discussed infra.

Assume further that the original requirement for gas was at a volume of 200 cubic feet per minute and that the consumer's requirement now changes to say 575 cubic feet per minute. The prior art again must rely on provision of a different compressor with a greater flow capability.

The present invention provides a kit of internal parts which are completely interchangeable and may be quickly and easily installed to provide the desired change in volumetric delivery.

Also assume that a well is depleted and it is desired to utilize the booster system at a different well. The prior art has faced a difficult transportation problem to make its fixed ratio boosters available at a different site in which that ratio can be effectively utilized.

The present invention provides a unitary arrangement of power source and compressor which may readily be transported to a new site and the internal stator and rotor structure of which can be readily varied to accommodate the compression ratio and delivery volume requirements of the new site.

Therefore, a primary object of my invention is to provide a fluid pressure booster having a basic housing into which selected ones of a kit of completely interchangeable internal complementary rotor and stator elements may be quickly and easily assembled on the site of a station to meet a wide variety of delivery conditions and requirements as to volume and pressure from fluid sources of various pressures.

A second major object is the provision of such a pressure booster designed and arranged for quick and easy interchangeability among the internal elements to meet changing conditions in the field and changing requirements of a consumer.

A further important object is provision of a gas compressor with a wide range of compression and volumetric capabilities.

Still another major object is provision of a compressor system of light-weight and compact construction suitable for easy transport from station to station and capable of providing adequate service over a wide range of conditions and requirements.

These and other objects and advantages of my invention will be readily apparent from the following specification taken in conjunction with the appended claims and the annexed drawings in which:

FIGURE 3 is an enlarged fragmentary view of a portion of the upper half of FIGURE 2, more clearly showing the compressor stage and stator arrangement;

FIGURE 4 is a side view, partially in section, of the diaphragm ring of the inlet stage of the compressor of FIGURE 2;

FIGURE 5 is a fragmentary sectional view taken along the line 5—5 of FIGURE 4;

Figure 1:
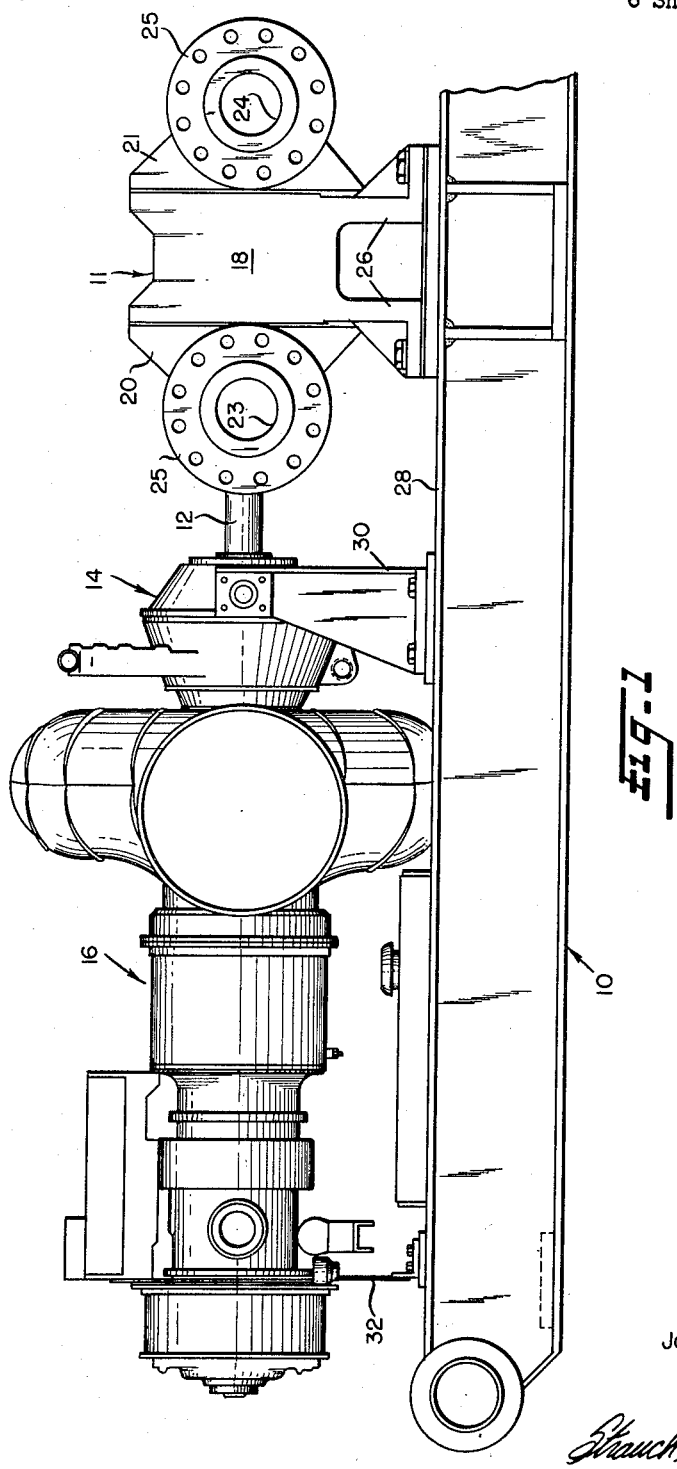
FIGURE 1 is a front elevational view of a portable pressure boosting station in accord with the principles of this invention and embodying a prime mover and a fluid pressure booster driven thereby.
Figure 2:
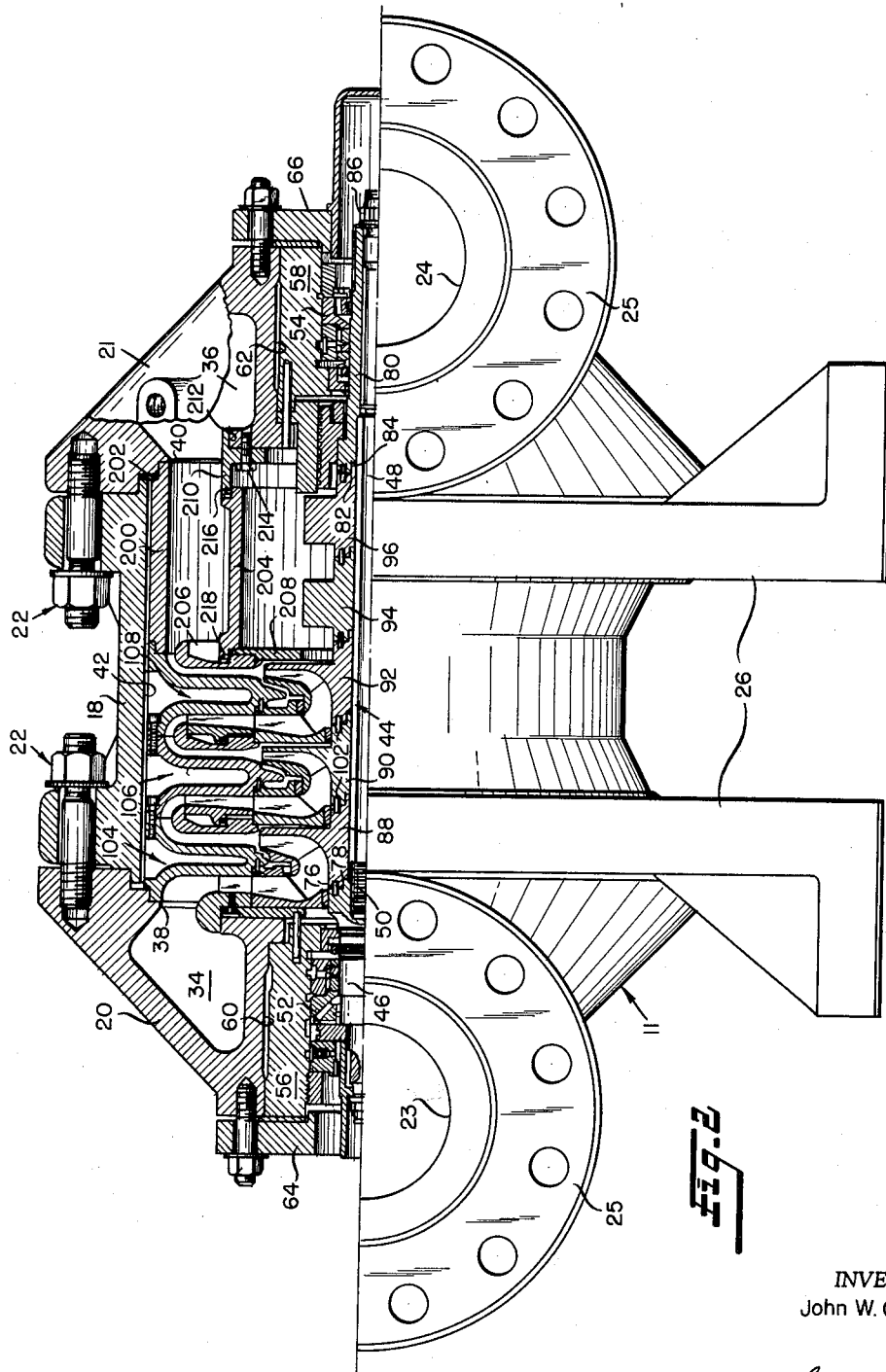
FIGURE 2 is a front elevational view, partly in section, of an illustrative arrangement of my pressure booster consisting of three compressor stages and two spaces in the basic housing.

Referring now to FIGURE 1, the fluid pressure booster station 10 of the present invention, there shown, embodies a fluid pressure booster in the form of a compressor 11 connected through a drive shaft 12 and a gear box 14 to a gas turbine 16. Turbine 16 may be of the type illustrated in United States Patent 2,801,518 issued August 6, 1957 to L. R. Wosika et al. for Gas Turbine, for example. The basic housing of compressor 11, as seen in FIGURE 1, comprises a central housing section 18 and interchangeable inlet and outlet end housing sections 20 and 21, said inlet and outlet housings 20 and 21 being detachably secured to the central housing 18, as shown in FIGURE 2, by peripheral rows of bolt and nut assemblies 22 with sealing gasket material interposed between the mating surfaces as required.

The inlet and outlet housings 20 and 21 are provided respectively with inlet and outlet conduit portions 23 and 24 which provide for flow through the compressor 11, each of the conduit portions 23 and 24 terminating in a flange 25 for attachment to the flanges on the piping system (not shown).

The central housing section 18 is provided with integral flanged legs 26 so the compressor 11 may be secured to a common rigid platform 28 which also carries the gas turbine 16 through the brackets 30 and 32. Bracket 32 is adjustable so that the compressor 11 and gas turbine 16 may be co-axially aligned upon installation on platform 28. As indicated above and as will be explained in detail presently, compressor 11 may be readily modified to accommodate a variety of pressure ratio and volumetric capacity requirements. Thus, a compact, readily transportable generally applicable unitary pressure booster station assembly 10 of power source 16 and compressor 11 is provided.

While an important part of my invention consists of the unitary assembly described supra, other aspects of the invention are related to the compressor per se and do not depend upon a gas turbine power source, but may be operated from an electric motor, by a reciprocating engine, or by other prime mover means.

Referring again to FIGURE 2, the inlet and outlet housing sections 20 and 21 are provided internally respectively with annular inlet and outlet chambers 34 and 36 in fluid communication with inlet 23 and outlet 24 respectively. Inlet chamber 34 has an annular side outlet opening 38 and outlet chamber 36 has an annular side inlet opening 40 facing the central pumping chamber 42 defined by the interior cylindrical wall of the intermediate housing section 18.

A rotor shaft assembly 44, comprising a power input section 46 and an extension 48 connected together in axial alignment at thread connection 50, extends co-axially through the chamber 42 defined by housing section 18, and is journalled at its opposite ends upon housing end sections 20 and 21 by sleeve bearing assemblies 52 and 54 which are mounted within tubular seal and bearing housings 56 and 58 respectively. Housing 56 and 58 are received within end bores 60 and 62 of housing sections 20 and 21 and retained therein by manifolds 64 and 66 respectively. As is more clearly shown in FIGURE 3, shaft assembly 44 is axially positioned within housing sections 18, 20 and 21 by a thrust bearing collar 68 fixed to shaft section 46 and interposed between thrust bearings 70 and 72 supported respectively by thrust bearing housing 74 and sleeve bearing assembly 52.

Referring again to FIGURE 2, shaft section 46 has a radially extending shoulder 76 and an axially extending hub 78. A sleeve 80 is received in surrounding relation upon the opposite end of shaft section 48. Sleeve 80 terminates at its left end as viewed in FIGURES 2 and 3 in a radial end face 82 and an axial bore 84 disposed in opposed relation to the shoulder 76 and hub 78 on shaft section 46. Sleeve 80 is retained upon and axially positioned along shaft section 48 by a nut 86 threaded upon the end of shaft section 48.

In the illustrated embodiment of the invention, a maximum of five impeller rotor stages can be assembled upon shaft assembly 44 between shoulder 76 and face 82 within the chamber 42. As illustrated there are three rotor stages 88, 90 and 92 and two spacer rings 94 and 96 so assembled. The hub structures of the rotor stages and spacer rings are identical, each having radially offset complementary annular axially projecting flanges 98 and 100 at its opposite ends which interfits with the complementary flanges of an adjacent ring or rotor stage to establish accurate relative axial alignment therebetween. The flange 98 of stage 88 interfits with hub 78 and flange 76 of shaft section 46 and the flange 100 of ring 96 interfits with end face 82 and bore 84 of sleeve 80 to establish axial alignment of the stages and rings 88–96 with the shaft assembly 44. The stages and rings 88–96 are interconnected and connected to shaft section 46 and sleeve 80 for unitary rotation with shaft assembly 44 by circumferentially spaced axially extending dowel pins 102 extending through flanges 98. Rotary manipulation of nut 86 (FIGURE 2) is operative in one direction to rigidly clamp stages and rings 88–96 between sleeve 80 and shaft section 46 and in the opposite direction to release them.

As is apparent from FIGURE 2, in final assembly, the shaft section 46, the hubs of impellers 88, 90 and 92, the spacers 94 and 96 and the sleeve 80 co-act to define a rotor shaft assembly which is hollow over the major portion of its length and which is held in assembly by the nut 86 and the shaft section 48 acting as a tie rod. Each of the sections of this shaft assembly is piloted upon the adjacent sections to maintain axial alignment and each section is accurately circumferentially oriented relative to and drive connected to its adjacent sections by the dowel pins 102.

By this arrangement, if fewer impeller stages are required additional spacer rings identical to the rings 94 and 96 can be substituted for the stage 92 or for stages 90 and 92. Conversely, if a greater number of impeller stages are required, impeller stages can be substituted for the ring 94 or for the rings 94 and 96. If greater or lesser volumetric capacity is desired, appropriately designed impeller stages can be substituted for the stages 88, 90 and 92.

Associated with each impeller stage which is mounted on shaft assembly 44 is a stator unit, stator units 104, 106 and 108 being associated respectively with impeller stages 88, 90 and 92. The inlet stator unit 104 comprises a diaphragm ring 110, an inlet guide vane ring 112 and a guide plate 114.

Referring to FIGURES 4 and 5, diaphragm 110 is a machined casting having three axially spaced radial walls 116, 118 and 120. Walls 116 and 118 are interconnected by radially extending uniformly circumferentially spaced fluid guide vanes 122 and define, with the guide vane ring 112, the fluid inlet channel for the first impeller stage. Walls 118 and 120 are connected by radially extending circumferentially spaced reinforcing ribs 124. Diaphragm 110 has an outer cylindrical surface 126 and an inner co-axial cylindrical surface 128 which surfaces co-act with the cylindrical surfaces 130 and 132 respectively (FIG- URE 3) on the inlet housing section 20 to accurately axially align the diaphragm 110 relative to inlet chamber 34.

Figure 6:
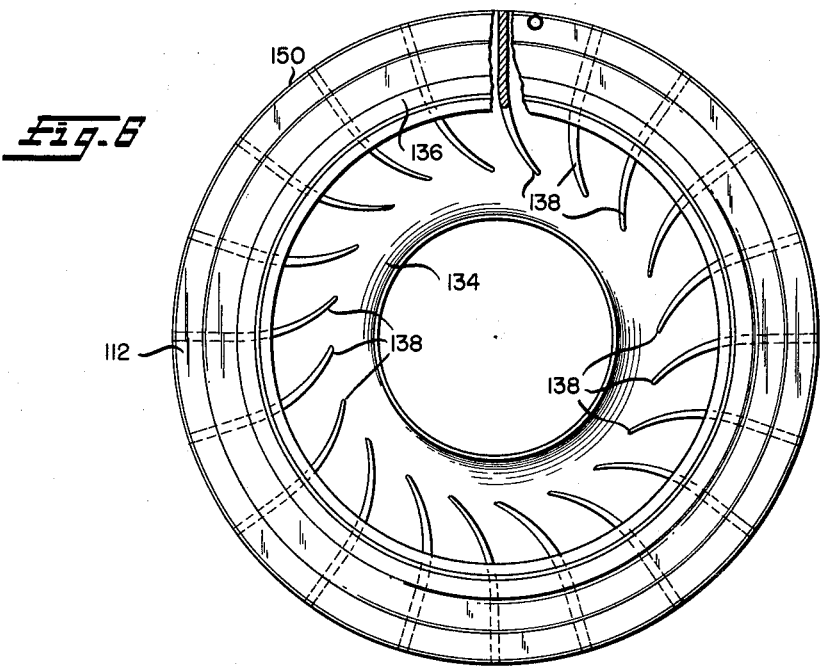
FIGURE 6 is a right side view of a typical guide vane ring at the inlet of a compressor rotor stage of the compressor of FIGURE 2.

The inlet guide ring 112 is a machined casting (FIGURES 3 and 6) having a pair of axially spaced generally radially extending walls 134 and 136 interconnected by guide vanes 138. As shown in FIGURE 3, walls 134 and 136 form inward extensions of walls 116 and 118 and support at their inner ends seal rings 140 and 142 cooperating respectively with a plurality of annular ribs 144 and 146 on shaft section 46 and impeller stage 88 to define labyrinth seals. Ring 112 is circumferentially oriented relative to diaphragm 110 by a dowel pin 148, axially aligned therewith by the piloting engagement of its cylindrical surface 150 (FIGURE 6) with the cylindrical surface 152 (FIGURE 5) of diaphragm 110, and is retained in position relative thereto by guide plate 114 (FIGURE 3). Guide plate 114 is fixed to diaphragm 110 by circumferentially spaced screws 154, sealed thereto by an interposed seal ring 156, and circumferentially oriented and fixed relative to housing section 20 by dowel pin 158 extending between plate 114 and seal and bearing housing 56. The diaphragm 110, the ring 112 and the plate 114 thus form a unitary assembly, stator unit 104, which is removable from and insertable into the housing section 18 as a unit. The periphery of diaphragm is in slightly spaced relation to the internal cylindrical wall of housing section 18 which defines chamber 42. A seal ring 160 establishes a fluid tight seal between surface 128 of diaphragm 110 and surface 132 of housing section 20.

Figure 7:
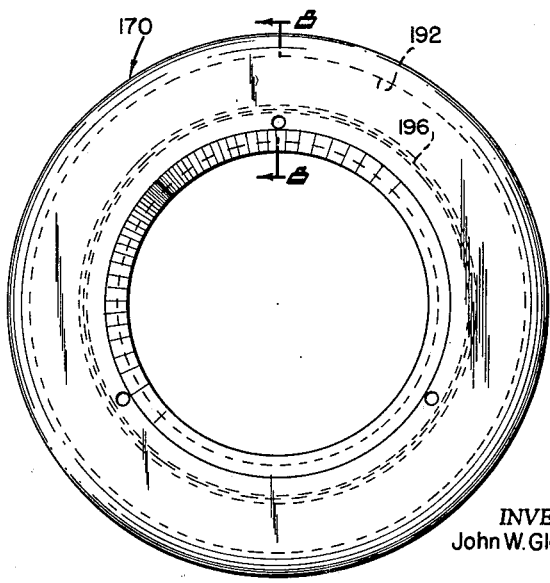
FIGURE 7 is a left side view of a typical diffuser ring at the outlet of a compressor rotor stage of the compressor of FIGURE 2.
Figure 8:
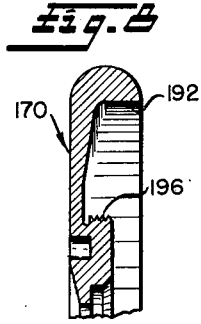
FIGURE 8 is a fragmentary sectional view along the line 8—8 of FIGURE 7.
Figure 9:
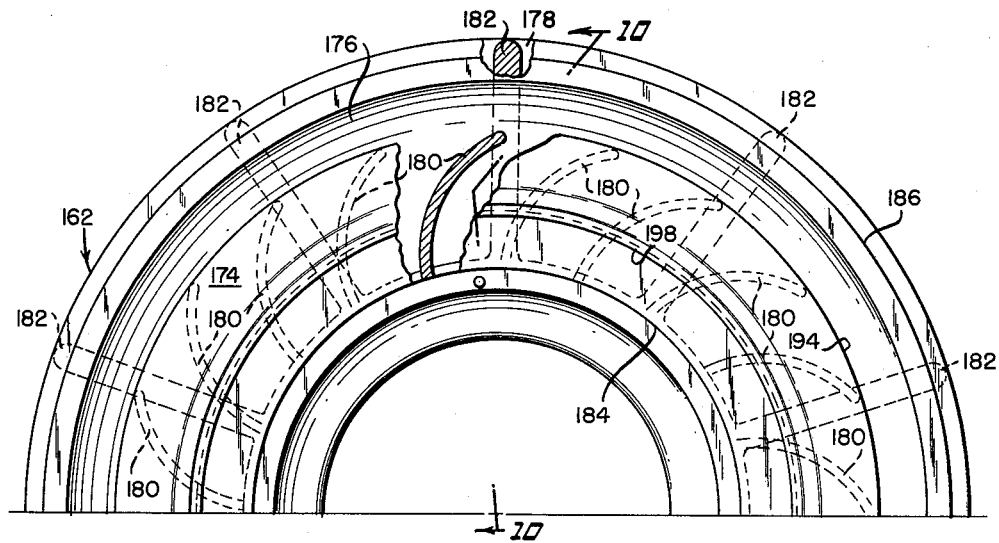
FIGURE 9 is a left side view of the upper half of a typical diaphragm ring for use with rotor stages downstream of the inlet rotor stage of the compressor of FIGURE 2.
Figure 10:
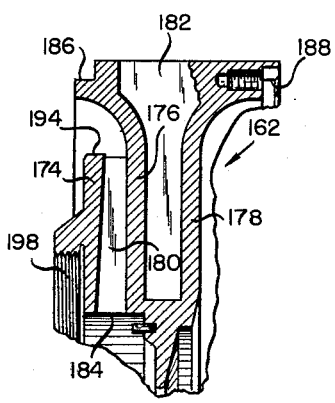
FIGURE 10 is a fragmentary sectional view taken substantially along the line 10—10 of FIGURE 9.

The stator units 106 and 108 are each unitary assemblies comprising a diaphragm 162, an inlet guide ring 164 supporting seal rings 166 and 168 and a diffuser ring 170 threaded at 172 upon diaphragm 162 and retaining ring 164 relative to diaphragm 162. Inlet guide rings 164 are similar in form to that of guide rings 112 shown in FIGURE 6. The structure of a typical diaphragm 162 is shown in FIGURES 9 and 10 and the structure of a typical diffuser ring 170 is shown in FIGURES 7 and 8.

Diaphragm 162 is a machined casting having spaced radially extending walls 174, 176 and 178, walls 174 and 176 being interconnected by guide vanes 180 and walls 176 and 178 by ribs 182. Walls 174 and 176 and vanes 180 define a cylindrical surface 184 which co-acts with the cylindrical periphery of guide ring 164 to establish axial alignment therebetween as shown in FIGURE 3. An external cylindrical surface 186 (FIGURE 10) on wall 176 interfits with an internal cylindrical surface 188 (FIGURE 3) on the next adjacent upstream diaphragm to establish axial alignment between adjacent stator units. The adjacent stator units are fixed together in assembly by circumferentially spaced screws 190.

The diffuser rings 170 (FIGURES 7 and 8) have internal cylindrical surfaces 192 which interfit over the cylindrical surfaces 194 (FIGURE 10) of the associated diaphragm 162 and are externally threaded at 196 (FIGURE 8) for threaded engagement with the internal threads 198 (FIGURE 10) on the associated diaphragm 162. Diffuser rings 170 cooperate with the downstream radial walls 120 (FIGURE 5) and 178 (FIGURE 10) of the adjacent upstream diaphragms to define a fluid outlet passage for the impeller stage associated with such upstream diaphragm.

The space between the diaphragm of the downstream stator unit such as 108 and the housing end section 21 is bridged by an annular insert sleeve 200 of a length equal to a whole number multiple of the length of one diaphragm (in the illustrated embodiment sleeve 200 being equal in length to the length of two diaphragms). A Belleville spring 202 interposed between the housing section 21 and the downstream end of sleeve 200 resiliently retains sleeve 200 and the diaphragms of the several stator units in axial assembly against the inlet housing end section 20.

As is best shown in FIGURE 2, sleeve 200 cooperates with an inner tubular member 204, a diffuser ring 206, a spacer disc 208 and an outlet diffuser adapter 210 to define an annular outlet channel guiding fluid flow from the downstream stator unit 108 to the annular outlet chamber 36 of the end section 21. Adapter 210 is co-axially piloted upon housing section 21 by mating cylindrical surfaces at 212 and fixed thereto by circumferentially spaced screws 214. Member 204 is connected to adapter 210 by a thread connection 216 and to diffuser ring 206 by a thread connection 218, plate 208 being clamped between diffuser ring 206 and member 204 as shown. When the maximum number of impeller stages and stator units is provided, diffuser ring 206 is mounted directly upon adapter 210 at the threaded connection 216. The effective axial length of tubular member 204 will be equal to a whole number multiple of the spacing between adjacent diffuser rings, being equal to twice such spacing in the illustrated embodiment.

Referring now to FIGURE 2, the central housing 18 is adapted to contain a maximum of five compressor stages with no spacers or a minimum of one compressor stage with four spacers. The specific arrangement shown consists of three compressor stages and two spacers. It will be readily appreciated that the central housing 18 may be extended to accommodate any reasonable number of compressor stages, the number to be determined by reference to the maximum pressure ratio desired, and that when conditions demand a lesser pressure ratio, one or more of the compressor stages may readily be replaced with spacers.

Referring particularly to FIGURE 3, each compressor stage is made up of a stator assembly and a rotor assembly, the former being supported by the compressor housing and the latter being supported upon and driven by the shaft 44 which is journalled in conventional bearings in the housing assembly and is driven by the power source 16 through the gear box 14 and the shaft 12 as shown in FIGURE 1.

Stator units other than inlet stator unit 104 are made up of a diaphragm, a guide vane and a diffuser, all of which are pinned or otherwise suitably separably joined together to form the desired compressor stator stage.

It will be noted that the diaphragm is supplied in two configurations, 104 which is adapted to cooperate with the inlet housing 20 for the compressor inlet stage and 162 which is adapted to cooperate with the guide vanes 164 and the diffusers 170 for any additional compressor stages.

A rotor stage consists of an impeller such as 88 suitably attached to the shaft 44 as described above for rotation therewith.

When less than a full complement of compressor stages is desired, the stator assemblies used are augmented by a stationary spacer ring 200 suitably attached at the one end to the last stator stage and at the other end to the outlet housing 21. The length of the stationary ring 200 will vary with the number of compressor stages utilized, being greater for fewer compressor stages and less for a greater number of stages, i.e., spanning the distance between the last stator and the outlet housing so that a secure unitary stator assembly is obtained when the outlet housing is bolted to the central housing.

When less than the full complement of compressor stages is utilized, the impellers are augmented by one or more rotary spacers such as 94 and 96 connected at the one end to the last impeller and at the other end to the shaft section 80.

It will be understood that suitable lubricating oil systems and gas and oil sealing means may be incorporated as desired, as shown in FIGURES 2 and 3, but not discussed in detail because such lubricating and sealing systems per se are old in the art and are not per se a part of this invention.

The specific assembly of compressor stages and spacers illustrated is designed to obtain a pressure ratio of 1.55:1 when natural gas is being compressed or boosted. The same arrangement will provide a pressure ratio of 1.95:1 when air is the medium and a ratio of 2.75:1 when carbon dioxide is being compressed. Other gases, of course, may be compressed to ratios depending upon the compressibility of the specific gas.

When all except the inlet compressor stage are replaced by spacers, a ratio of 1.17:1 is obtained with natural gas, for which two compressor stages realize a 1.35:1 ratio, four compressor stages provides a ratio of 1.80:1 and a ratio of 2.05:1 is obtained with the full complement of five compressor stages.

It is within the contemplation of my invention to provide compressor stages in a variety of configurations, all interchangeable and easily replaceable, to accommodate a wide range of volume flow requirements. For example, one design will support a flow of from 113 to about 200 c.f.m.; a second design has a range of about 200 to 325 c.f.m.; a third, a range of about 325 to 575 c.f.m.; a fourth, a range of about 575 to 1000 c.f.m.; and a fifth, a range of from about 1000 to 1600 c.f.m., depending on the design of the blades and flow passages of the diaphragms, impellers and guide vane rings.

Various configurations may be adopted to provide the flow desired, the primary concern, in accord with the present invention, being that any configuration must be so designed to be interchangeable with any other configuration. Further, it is contemplated that various configurations may be incorporated into the basic housing as required.

From the foregoing detailed description it is apparent that the present invention provides pressure booster means of selectively variable pressure ratio and volumetric capacity embodying a housing structure defining a pumping chamber of fixed length having an inlet at one end thereof and an outlet at the other end thereof and a shaft assembly extending through the pumping chamber and journalled at its opposite ends upon the housing in which can be selectively operatively assembled one or more cooperating impeller stages and stator units of preselected flow characteristics, an improved portable pressure boosting station which may be readily adapted to accommodate a wide variety of pressure and flow requirements which may be encountered and various sites in which it may be installed, and an improved method of accommodating pressure and volumetric delivery requirements in a pipe line.

The invention may be embodied in other specific forms without departing from the spirit or essential characteristics thereof and the present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A fluid pumping device comprising:
   (a) an inlet member,
   (b) an outlet member,
   (c) a hollow intermediate member,
   (d) means rigidly but detachably interconnecting said intermediate member to and between said inlet and outlet members,
   (e) a multi-section shaft assembly journalled at its opposite ends on said inlet member and outlet member and extending through said hollow intermediate member,
   (f) a rotor assembly comprising a plurality of axially slidably interfitting sections surrounding the central portion of said shaft assembly in radially spaced relation thereto and axially clamped in detachably fixed relation thereto between opposed portions of relatively axially movable sections of said multi-section shaft assembly whereby said shaft assembly functions as a tie-bolt for holding the sections of said rotor assembly in place without material direct radial restraint of such sections so that said rotor sections can be readily removed upon disassembly of said shaft assembly,
   (g) a stator assembly comprising a plurality of axially slidably interfitting sections disposed within said hollow intermediate member and detachably, axially clamped in fixed position therein between said inlet and outlet members,
   (h) at least one of said rotor sections comprising an impeller stage and at least one of said stator sections comprising an inlet guide vane and diaphragm cooperating with said impeller stage to guide fluid into the inlet of said impeller stage,
   (i) at least one of said rotor sections at the end of said rotor assembly adjacent said outlet member comprising an annular spacer ring, and
   (j) at least one of said stator sections at the end of said stator assembly adjacent said outlet member comprising a pair of concentric fluid guide rings extending coaxially with said spacer ring.

2. A fluid pumping device comprising:
   (a) an inlet member,
   (b) an outlet member,
   (c) a unitary, hollow open ended cylindrical housing having opposite, axially aligned inlet and outlet ends and interposed axially between said inlet and outlet members,
   (d) means detachably mounting said inlet member and said outlet member on said housing respectively at said inlet and outlet ends,
   (e) a multiple section shaft assembly coaxially mounted for rotation in said housing and having opposed, relatively axially movable sections,
   (f) a rotor assembly comprising a plurality of axially slidable interfitting sections surrounding the central portion of said shaft assembly axially between said relatively axially movable sections,
   (g) a stator assembly comprising a plurality of interfitting sections axially slidably mounted coaxially within said housing and matched to respective ones of said rotor sections to provide a plurality of stages, and
   (h) a dummy assembly interchangeable with matched ones of said rotor and stator sections and being insertable through the outlet end of said housing when said outlet member is removed, said dummy assembly comprising:
      (1) at least one annular spacer, and
      (2) a pair of coaxial fluid guide rings,
      (3) said annular spacer surrounding said shaft assembly between the rotor section at the end of said rotor assembly adjacent said outlet end and one of said rotor assembly adjacent said outlet end and one of said relatively axially movable sections of said shaft assembly,
      (4) said fluid guide rings being disposed coaxially with said annular spacer at the end of said stator assembly adjacent the outlet end of said housing and defining an annular, axially extending passage for directing fluid to said outlet member,
   (i) said rotor sections and said annular spacer being disposed in interfitting relationship and being axially clamped in detachably fixed relation between opposed portions of said relatively axially movable sections of said shaft assembly.

References Cited by the Examiner
UNITED STATES PATENTS

| | | | |
|---|---|---|---|
| 1,049,387 | 1/13 | Noll | 103—93 |
| 1,079,682 | 11/13 | Wintroath | 103—102 |
| 1,610,360 | 12/26 | Clements | 230—130 |
| 1,875,419 | 9/32 | Claypool | 103—102 |

(Other references on following page)

UNITED STATES PATENTS

| | | | |
|---|---|---|---|
| 2,108,786 | 2/38 | Bigelow et al. | 103—108 |
| 2,380,606 | 7/45 | Moody | 103—108 |
| 2,441,855 | 5/48 | Trumpler | 230—116 |
| 2,648,491 | 8/53 | Wood | 230—116 |
| 2,706,451 | 4/55 | Mayer-Ortiz et al. | 103—93 |
| 2,726,606 | 12/55 | Davidson | 103—93 |
| 2,777,632 | 1/57 | Kishline et al. | 230—116 |
| 2,812,111 | 11/57 | Wright et al. | 103—108 |
| 2,816,509 | 12/57 | Rice | 103—108 |
| 2,841,087 | 7/58 | MacMeekin et al. | 103—108 |
| 2,916,198 | 12/59 | Weisel | 230—116 |
| 3,051,090 | 8/62 | Zumbusch | 230—133 |

FOREIGN PATENTS

| | | |
|---|---|---|
| 1,102,336 | 3/61 | Germany. |
| 25,391 | 1905 | Great Britain. |
| 7,807 | 12/95 | Sweden. |

JOSEPH H. BRANSON, Jr., *Primary Examiner.*

ROBERT M. WALKER, LAURENCE V. EFNER,
*Examiners.*